United States Patent [19]

Anderson

[11] Patent Number: 4,472,094
[45] Date of Patent: Sep. 18, 1984

[54] TURNING TOOL

[76] Inventor: James D. Anderson, 54 Hubbard Ave., San Fernando, Calif. 91340

[21] Appl. No.: 346,902

[22] Filed: Feb. 8, 1982

[51] Int. Cl.³ .............................. B26D 1/12; B23B 5/00
[52] U.S. Cl. .................................. 408/203.5; 407/116
[58] Field of Search ................. 408/82, 83, 83.5, 227, 408/203.5; 407/116; 29/426.1, 426.4

[56] References Cited

U.S. PATENT DOCUMENTS 3,762,007 10/1973 Dion et al. ....................... 408/203.5

FOREIGN PATENT DOCUMENTS 1073276 1/1960 Fed. Rep. of Germany ...... 408/224

Primary Examiner—Z. R. Bilinsky
Attorney, Agent, or Firm—William H. Haefliger

[57] ABSTRACT

A high speed turning tool comprises:
(a) a generally cylindrical body having an axially extending bore,
(b) multiple cutters at one end of the body and spaced about said axis,
(c) each cutter having a front face and a cutting edge which extend in a generally radial axial plane, the cutter edges equally spaced about said axis,
(d) each cutter having a back flank which extends at a relatively shallow angle from said edges and into proximity with the front face of the preceeding cutter and therewith define a first chip curl space,
(e) there being additional and substantial chip curl space formed by the extension of said back flank into proximity to a body front face extending outwardly relative to said first curl space.

8 Claims, 5 Drawing Figures

TURNING TOOL

BACKGROUND OF THE INVENTION

This invention relates generally to high speed turning tools, and more particularly concerns the design of metal turning tools.

There is need for tools capable of fitting over work shanks on shafts, and which may be characterized as rugged and non-clogging as respects chip discharge, and as having multiple cutting edges. Prior tools lack the unusual features of construction and mode of operation of the tool described herein, including high cutting speed, and which eliminates the problem of chip clogging.

SUMMARY OF THE INVENTION

It is a major object of the invention to provide a hard, tough, rugged turning tool capable of running coaxially over a shaft or shank, and as preventing clogging of chips between cutting edges, during high speed operation. Basically, the tool comprises:

(a) a generally cylindrical body having an axially extending bore, (b) multiple cutters at one end of the body and spaced about the axis, (c) each cutter having a front face and a cutting edge which extend in a generally radial axial plane, the cutting edges equi-distantly spaced about the axis, (d) each cutter having a back flank which extends at a relatively shallow angle from said edge to extend proximate the front face of the preceeding cutter and therewith define a first chip curl space, (e) there being additional and substantial chip curl space formed by the extension of the back flank into proximity with and to a body front face extending outwardly relative to said first curl space.

Further, and as will appear, the tool typically has generally frusto-conical surface extents outwardly of the back flanks and cutting edges, those surfaces spiraling rearwardly from additional edges defined by intersections of the body front faces with the additional frusto-conical surface extents; the cutting edges may be inclined inwardly from planes normal to the tool axis, or may be parallel to such planes; and the bore may be tapered in a direction to prevent binding on the shaft or shank.

These and other objects and advantages of the invention, as well as the details of an illustrative embodiment, will be more fully understood from the following description and drawings, in which:

DRAWING DESCRIPTION

DETAILED DESCRIPTION

Figure 1:
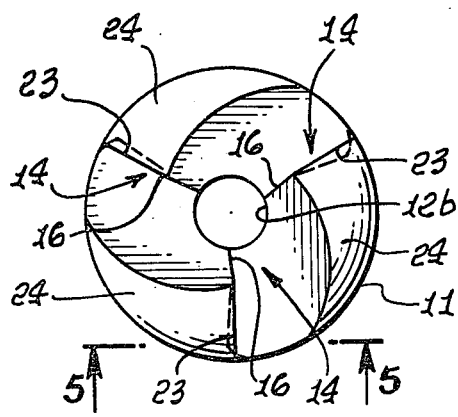
FIG. 1 is an end view of a turning tool embodying the invention.
Figure 3:
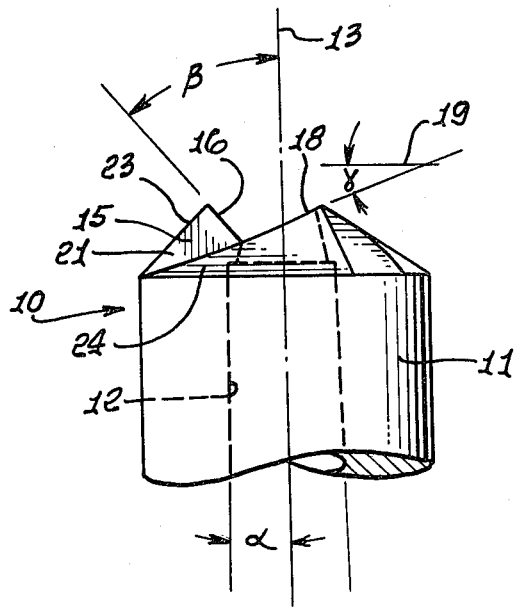
FIG. 3 is a side elevation of the FIG. 1 and FIG. 2 tool.
Figure 2:
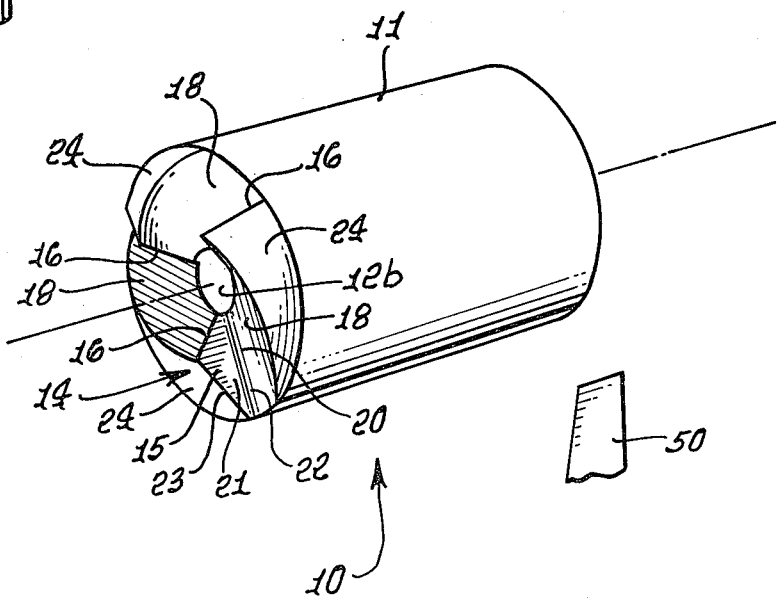
FIG. 2 is a perspective view of the FIG. 1 tool.

In FIGS. 1-3, the high speed turning tool 10 may consist of tungsten carbode, or similarly very hard, tough material, as for example alloy steel.

Figure 4:
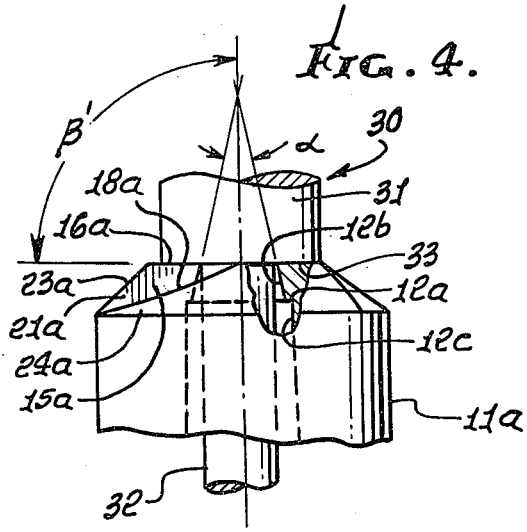
FIG. 4 is a view like FIG. 3, but showing a modified tool, in cutting engagement with work.
Figure 5:
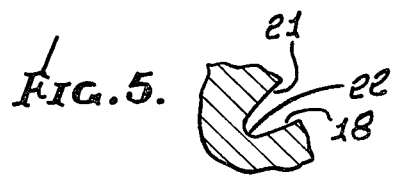
FIG. 5 is a fragmentary section on lines 5—5 of FIG. 1.

The tool 10 has a cylindrical body 11 with an axial bore 12, steped at 12a. As shown in FIGS. 3 and 4, bore upper extent 12b is tapered, at an included angle $\alpha$ less than one degree, and preferably about $\frac{1}{8}$ degree, for best results. Bore lower extent 12c, i.e. the counterbore, is cylindrical. Surface 11 is adapted to be gripped by a collet or holder indicated schematically at 50, and rotated. The bore extent 12b tapers axially, slightly, to permit ready acceptance, without binding, of the shank of work (such as carbon steel) received through the bore during cutting. Included angle $\alpha$ in FIG. 4, diverges axially away from the cutting end of the tool. Thus, the diameter of bore extent 12b increases in that direction. Angle $\alpha$ is formed between the tool axis 13 and the line formed by the intersection of the bore extent 12b with an axial radial plane.

The tool incorporates multiple cutters with cutting edges at one end of the body, and spaced about axis 13. Three such cutters 14 are shown, but there may be two, four or more. Each cutter 14 has a front face 15 with a cutting edge 16 extending in a generally radial, axial plane; thus the face 15 and edge 16 both extend away from the bore opening 12a, as is clear in FIG. 1. In FIG. 3, the cutting edges 16 are slanted at acute angles $\beta$ relative to axis 13; whereas in the modified form of FIG. 4, the corresponding edges 16a are normal (90° angle $\beta'$), relative to axis 13. Edges 16 and 16a intersect bore 12, as seen in FIG. 1.

In addition, each cutter has a back flank 18 which extend in a substantially flat plane, and at a relatively shallow angle $\gamma$ relative to a plane 19 normal to axis 13. Angle $\gamma$ is typically between 7° and 25°, and for best results is between about 10° and 15°. Back flank 18 extends from edge 16 rearwardly (about axis 13) to intersect the front face 15 of the preceding cutter at a concave fillet 20, and thereby define a chip curl space and underlying cutting edge 16. The curvature of the corner or fillet is such as to produce chip breaking, i.e. it is small enough to cause chip cracking. Typically, the fillet radius is between 0.035 and 0.040 inches.

Further, and in accordance with a further important aspect of the invention, additional and substantial chip curl space is formed between back flank 18 and body front face 21 extending outwardly (relative to bore 12) and also relative to the first mentioned curl space. Fillet 22 forms an outward continuation of fillet 20. In this regard, an additional edge 23 is defined by the intersection of body front face 21 with generally frusto-conical surface extent 24 of the body located generally radially outwardly of the back flank 18, and spiraling rearwardly (about axis 13) from edge 23 to merge with the body outer surface 11, as is clear from FIG. 1. As a result, a substantial, shallow angled chip curl space is formed adjacent fillets 20 and 22 and adjacent faces 15 and 21, to assure prevention of chips clogging in the tool during cutting and to assist in chips breaking; also, the heavy duty body of the tool outwardly of the cutting edges 16, and as represented by surfaces 24, contributes to smoothness of cutting and absense of chip clogging. Note that lines 23 and 22 converge toward one another, in a radially outward direction, which aids chip clearance and discharge over edge 23.

In FIG. 4, the corresponding elements have corresponding numbers, with "a" appearing after same. Also, work 30 has an original cylindrical surface 31, and a reduced cylindrical surface 32 formed by the turning operation. Note step shoulder 33 cut by the tool.

From the above it will be seen that by using a tool with multi-cutting edges, it is possible to reduce the pushing effect or eliminate the pressure of the tool in contact with the material being turned. With a multi-cutting tool with equal spaced cutting edges, any unbalanced pressure exerted by contact with material being machined, is nullified by the other cutting edges which have similar contact pressure in an opposite direction or directions. The cancelling out of the tool pressure enables machining to proceed smoothly, with absence of tool chatter, which in turn greatly increases tool life. By utilizing radial thrust or pressure, and eliminating side pressure, it becomes possible to machine a cylindrical diameter to much greater length than is possible with present tools having single cutting edges.

The present tool can be utilized in various modes, i.e. vertically, horizontally, or upside down. It can be kept stationary while work material is being turned and fed to and through it; or, it can be turned while the work material is being held stationary. Also it can be turned while the work material is also being turned in the opposite direction. Finally, the end cutting edges can be reversed to allow for left handed turning.

I claim:

1. In a high speed turning tool,
   (a) a generally cylindrical body having an axially extending first bore and a cylindrical outer wall,
   (b) multiple cutters at one end of the body and spaced about said axis,
   (c) each cutter having a front face and a cutting edge which extend in a generally radial axial plane, the cutting edges equally spaced about said axis,
   (d) each cutter having a back flank which extends at a relatively shallow angle from said edges and into proximity with the front face of the preceeding cutter and therewith define a first chip curl space,
   (e) there being additional and substantial chip curl space formed by the extension of said back flank into proximity to a body front face extending outwardly relative to said first curl space,
   (f) the tool having generally frusto-conical surface extents outwardly of said back flanks and cutting edges, and spiraling rearwardly from additional edges defined by intersections of said body front faces with said frusto-conical surface extents, said frusto conical surface extents diverging toward intersections with said body cylindrical outer wall, said additional edges overlying said additional curl spaces, said cutting edges intersecting said additional edges.

2. The tool of claim 1 wherein said cutting edges are inclined inwardly from planes normal to the tool axis.

3. The tool of claim 1 wherein said cutting edge extends generally parallel to planes normal to the tool axis.

4. The tool of claim 1 wherein there are three of said cutters spaced about said axis.

5. The tool of claim 1 wherein said bore has a diameter which increases in an axial direction extending away from the cutters.

6. The tool of claim 1 wherein said additional edges intersect said cutting edges.

7. The tool of claim 1 wherein said tool has a reduced diameter bore radially inwardly of said cutters, said reduced diameter bore having a taper extending axially in a direction beyond said one end of the body, said reduced diameter bore and said first bore defining an annular step radially inwardly of said back flank.

8. The tool of claim 7 wherein said taper defines an included angle which is less than one degree.

* * * * *